June 2, 1970  S. P. SOLOW  3,515,474
CUE SIGNAL FOR MOTION PICTURE FILM
Filed May 3, 1968
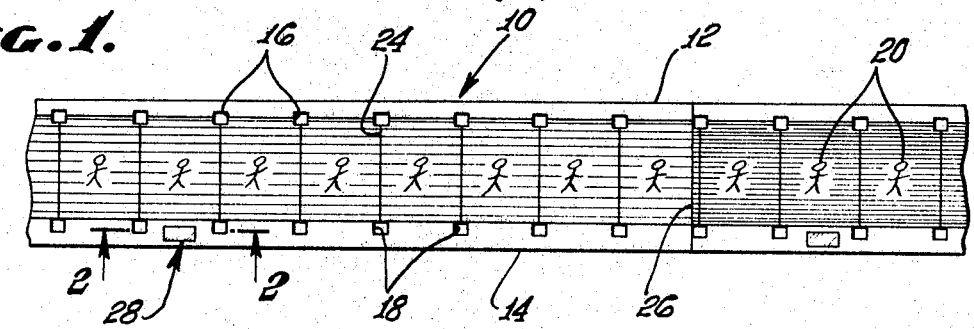
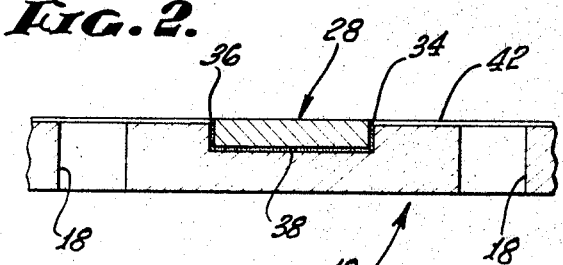
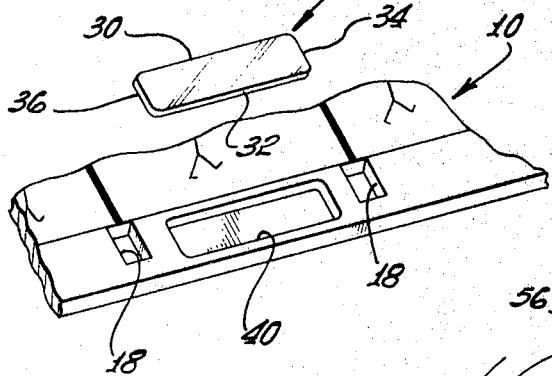
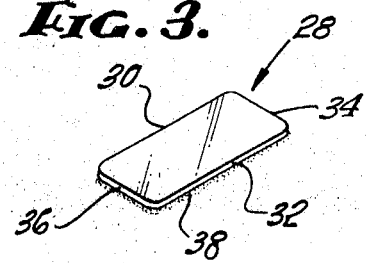
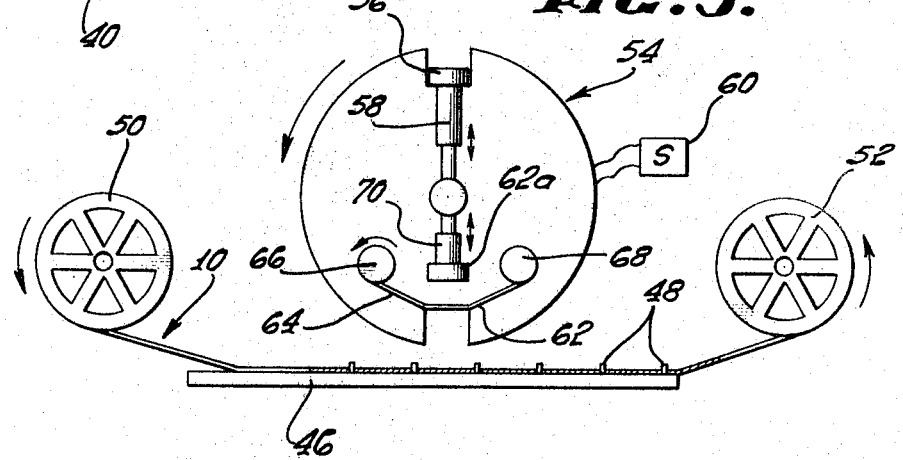
INVENTOR
SIDNEY P. SOLOW
BY Huebner & Worrel
ATTORNEYS.

United States Patent Office 3,515,474
Patented June 2, 1970

3,515,474
CUE SIGNAL FOR MOTION PICTURE FILM
Sidney P. Solow, Beverly Hills, Calif., assignor to Consolidated Film Industries, Hollywood, Calif., a corporation of New York
Filed May 3, 1968, Ser. No. 726,506
Int. Cl. G03b 21/50
U.S. Cl. 352—236                    9 Claims

ABSTRACT OF THE DISCLOSURE

A cue signal device for motion picture negatives, or originals, and method of forming same. The signal device includes a cue signal comprising a substance affixed in a recess formed in the film adjacent the marginal edge thereof so that the varying density of the film can be cued to a motion picture film printer whereby responsive mechanism within the printer can adjust the proper light intensity during the preparation of a print. The cue signal can also be employed to trigger other responsive mechanism within the printer for creating lap dissolves, fades, etc.

BACKGROUND OF THE INVENTION

This invention comprises a cue signal which is applied to a motion picture film to trigger responsive mechanism such as an electronic device within a film printer whereby the light intensity may be varied in the preparation of a print from the negative or original. The cue signal is set in a predetermined and preformed groove or recess adjacent one of the marginal edges of the film. Preferably, the cue signal is generally rectangular in shape and comprises a metallic tape substance having an adhesive on the bottom portion of the signal so that it will adhere to the film within the recess or groove.

In the preparation of a final motion picture print, various sections of film negatives are used. Normally, each of the negative sections, whether they are black and light or color, differ in light density because of differing circumstances under which the picture is "shot." Thus, when the negative sections are spliced together to form the desired continuity of a whole film negative, it becomes essential to utilize some apparatus and/or method to key the positive film printer to adjust the light within the printer to the proper intensity so that the final positive print which emerges from the printer is consistent and all the right light tones are achieved.

In the prior art, physical notches or cutouts have been cut into the marginal edge of motion picture negatives which when engaged by a sensor finger of the printer will accomplish a response and the desired light change. This particular method is defective in that normally the notch will extend a distance greater than the distance between adjacent sprocket holes on the film so that the constant use of the negative, or original, in preparing positive prints will cause it to break and deteriorate faster than normal.

Subsequent to the notch method, a metallic band or patch was applied directly to a predetermined position adjacent the margin of the negative or original film. However, in view of the fact that the patch or signal must be applied to the emulsion side of the film, it was necessary to scrape the emulsion off of the film first before the cue signal would adhere to the negative or original. This was time consuming, and also, because the signal band or patch was placed on the surface of the film, the signal was raised substantially above the surface and created unevenness in the rolling of the motion picture film on a reel, as well as having the further and important disadvantage of being unintentionally easily frictionally removed or shifted from the predetermined location.

Another disadvantage of the above prior art device is apparent because, in the film industry, it is customary for the original negative film material to be subjected to solvent cleaning. The solvent, in the past, has had a tendency to soften the adhesive on the signals and promote the possibility of movement into the picture area of the negative or for complete removal.

SUMMARY OF THE INVENTION

This invention utilizes a groove or recess formed in the marginal edge of a film between two sprocket holes, and fitted within the recess is a metallic, preferably rectangular, pressure-sensitive adhesive tape cue signal which may be detected by an electrical metallic reader such as an induction device in a film printer, and by appropriate electrical means vary the light source within the printer, depending upon the density of the specific section of negative then passing the light source. In the modern refined film printers, the amount of light change is programmed in advance, as are other mechanical functions, so that the cue signals will trigger the proper response.

The film negative may be properly positioned whereby a heating element, grinding wheel, or other means, may be employed to form the recess along the marginal edge of the negative film, and then a punch and die may be utilized to punch the desired cue signal and simultaneously affix it within the recess so that the top of the cue signal is approximate the emulsion planar surface of the negative film.

It is one of the objects of this invention to provide a cue signal which is not easily dislodged once it is positioned on negative film.

A further object of this invention is to provide a metallic insert adjacent the marginal edge of a negative film to be utilized in a printing machine as a signal whereby the light source within a printer will respond in the proper manner.

Another object of the invention is to provide a method for the preparation of a recess in the marginal edge of a film negative, the punching of a cue signal insert, and the insertion of the cue signal insert within the recess of negative motion picture film.

A further object of this invention is to provide a cue signal insert adjacent a marginal edge of a motion picture film negative which may be readily removed if and when it is desired to change the location of the particular cue signal without damaging the film or weakening it.

A still further object of this invention is the application of a cue signal insert adjacent the marginal edge of a motion picture film negative which will not weaken or damage the negative film.

Other objects and advantages will be apparent from the following description and drawings wherein:

BRIEF DESCRIPTION OF THE DRAWINGS

FIG. 1 is an illustration of spliced sections of a negative motion picture film, including the cue signal insert of this invention;

FIG. 2 is an enlarged cross sectional view taken on line 2—2 of FIG. 1, showing the cue signal insert in position on a strip of negative film;

FIG. 3 is a perspective view of the cue signal insert;

FIG. 4 is an exploded perspective view of the cue signal insert and a portion of negative film; and FIG. 5 is a schematic representation of one of the methods of forming and applying the cue signal insert on a strip of negative motion picture film.

DESCRIPTION OF THE PREFERRED EMBODIMENTS

As can best be seen in FIG. 1, there is illustrated a negative or original motion picture film, generally designated 10. The film 10 is of the standard commercially available type, including parallel marginal edges 12 and 14, and including sprocket holes 16 and 18 adjacent the respective edges 12 and 14. The film includes individual frames 20 which include negative reverse images 22. These frames are separated by frame line 24. While negative reverse images are illustrated, any type of original film can be used, including positive film.

As is customary in the final working negative of a motion picture film, several sections of negatives exposed at different times, and sometimes places, must be spliced together to form a final negative. As illustrated in FIG. 1, there is a splice line 26 representing the splicing together of two sections of negatives. As can be seen from the drawing, the section on the right-hand side of the splice line 26 is represented as being of a darker intensity than the strip of film on the left side of the splice line 26.

The invention resides in a signal device means on the negative 10, illustrated in FIGS. 1 through 4. The device generally comprises a cue insert 28, preferably positioned between two sprocket holes 18 and adjacent the marginal edge 14 of the negative 10.

The purpose of the insert 28 is to cue or trigger responsive mechanism, not a part of this invention, within a film printer. The mechanism will then adjust the printing light within the printer to compensate for various negative film densities. Also mechanism within the printer can be triggered to create lap dissolves, fades, and other film effects.

It is very rare that each section of a negative motion picture film is of the same density. There are various contributing factors such as exposure of the film, development time, and chemicals used in developing the film which can cause the variances.

Normal procedure requires a visual inspection of the negative film by a trained technician who will predetermine where the cue signal is to be placed on the negative film.

In the preferred embodiment, the cue signal insert 28 is formed of flexible metallic tape which may be affixed to the negative. With new printing machines available, the cue signal insert being formed of a metallic substance can be detected by an electronic device within the printer. The printing apparatus per se does not form a part of this invention.

The cue signal 28, preferably rectangular, includes a pair of elongated side walls 30 and 32 and a pair of parallel end walls 34 and 36. The thickness of the cue signal 28 is preferably 1/64 of an inch, and the underneath portion is coated with a self-adhering, pressure-sensitive adhesive 38.

In order to affix the cue signal 28 to the film 10, a notch 40 is burned, ground, or otherwise formed in the predetermined spot on the marginal edge of the film between two sprocket holes 18. The shape of the notch 40 corresponds to the perimeter of the cue signal 28, and is formed of a depth generally complementary to the total thickness of the strip 28 and adhesive 38. After the notch is formed, the strip is placed into position, such as is shown in FIGS. 1 and 2, so that the top of the strip approximates the upper planar portion of the emulsion 42 on the surface of the negative 10.

With the cue insert 28 being positioned in the recess 40, it will remain locked in place and will not shift into either the film image portion of the film or off of the film. This will assure a proper reading or cueing of the printer during the print stage as the negative passes therethrough. Further, with the cue insert being recessed as is illustrated in FIGS. 1 and 2, the winding of negative film on a film reel will not be distorted, and there will be an even, proper winding.

Because the adhesive 38 is of the pressure-sensitive type, if it should ever become necessary to change the light intensity of the respective negatives, the cue insert 28 may be pried out and removed, leaving no signal that could be misread by the printing machine.

While the preferred cue signal 28 is rectangular, any shape may be utilized without departing from the spirit of the invention to accomplish the desired result.

One method of forming the recess 40, cutting the cue insert 28 and affixing it to the film negative, is illustrated schematically in FIG. 5.

There is provided a film holder base plate 46 having a plurality of sprockets 48 adapted to engage several sprocket holes 18 of the negative or original film 10. In operation, the film 10 proceeds from a take-off reel 50 across the plate 46 and sprockets 48 to a take-up reel 52.

When the negative or original film 10 is properly positioned along the plate 46 where the desired cue signal 28 is to be placed in the film, a rotatable assembly 54, schematically illustrated in FIG. 5, is rotated so that a heating or branding element 56 of the desired configuration, is placed above the film, and a hydraulic ram 58, which can be activated by a multiple switch 60, is lowered to burn the desired recess 40. The assembly 54 is then rotated again by multiple switch 60 so that a die 62 and punch 62a within the assembly 54, of the desired configuration, is in position above the film. There is schematically illustrated a roll of metallic tape 64, which moves from a take-off reel 66 to a take-up reel 68. The metallic strip 64 passes over the die 62, and the punch 62a, through the multiple switch 60, is activated by hydraulic ram means 70 to extend downwardly and cut the tape 64 to produce the cue insert 28. The punch 62a continues out through the apparatus 54 and presses the cue signal 28 into place within the recess 40. The negative or original film 10 is then wound on a take-up reel 52 to the next preselected position for a cue signal.

The apparatus illustrated in FIG. 5 is a schematic representation of one method of preparing the recess, cutting a cue insert, and affixing it to the film. It should be realized that other methods, such as grinding the recess, manually forming the signal 28, and securing it in position, can be used with equal success without departing from the spirit of the invention.

While the specification has referred specifically to negative or original film, it should be realized that such film can also include a reverse original or any other film from which copies are to be made, and is not limited to negatives in the usual photographic sense.

While the instant invention has been shown and described herein in what is conceived to be the most practical and prefered embodiment, it is recognized that departures may be made therefrom within the scope of the invention which is therefore not to be limited to the details disclosed herein but is to be accorded the full scope of the claims so as to embrace any and all equivalent devices.

What is claimed is:

1. A signal device for motion picture film having sprocket holes along a marginal edge thereof, said device adapted to trigger a change response in a film printer comprising: a recess formed adjacent a marginal edge of said motion picture film, a cue insert complementary to said recess and secured therein whereby when said film passes through said film printer, said cue insert will trigger responsive mechanism in said printer to effect a mechanical change therewithin.

2. A signal device as defined in claim 1, wherein said cue insert includes a coating of pressure-sensitive adhesive to secure said insert in said recess.

3. A signal device as defined in claim 1, wherein said cue insert when secured in said recess lies generally coplanar with the surface of said motion picture film.

4. A signal device as defined in claim 1, wherein said cue insert is a relatively thin flexible metallic patch.

5. A signal device for motion picture film having sprocket holes along a marginal edge thereof, said device adapted to create a light intensity change response in a film printer comprising: a generally rectangular recess formed adjacent a marginal edge and between sprocket holes of said motion picture film, a relatively thin flexible metallic cue insert having a coating of pressure-sensitive adhesive, said cue insert adhesively secured within said recess and complementary therewith, whereby when said film passes through said film printer, said cue will trigger responsive mechanism in said printer to effect a light intensity change therewithin.

6. A method of forming a signal device in a motion picture film having sprocket holes along a marginal edge thereof comprising the steps of positioning a predetermined marginal portion of said motion picture film, forming a recess in said predetermined position of film, providing a cue insert to be positioned in said recess, affixing said cue insert within said recess whereby said insert when positioned will lie coplanar with the surface of said motion picture film.

7. A method of forming a signal device as defined in claim 6, wherein pressure-sensitive adhesive is used to affix said cue insert.

8. A method of forming a signal device as defined in claim 6, wherein said recess is formed of a predetermined depth, and said cue insert is generally of a thickness corresponding to the depth of said recess.

9. The combination of: a negative motion picture film having sprocket holes along a marginal edge thereof; a recess formed adjacent said marginal edge and between sprocket holes of said negative film; a cue signal insert complementary with said recess and secured therein whereby said cue signal insert is adapted to trigger a light intensity change response in a film printer as said negative film passes therethrough to prepare a positive film print.

References Cited

UNITED STATES PATENTS

| | | | |
|---|---|---|---|
| 3,309,163 | 3/1967 | White | 352—131 |
| 2,905,048 | 9/1959 | Miller | 352—92 X |
| 1,950,518 | 3/1934 | Read | 200—52 |

FOREIGN PATENTS 1,015,676  9/1957  Germany.

NORTON ANSHER, Primary Examiner

M. D. HARRIS, Assistant Examiner

U.S. Cl. X.R.

352—92